(12) United States Patent
Ninan

(10) Patent No.: US 9,564,078 B2
(45) Date of Patent: Feb. 7, 2017

(54) QUANTUM DOTS FOR DISPLAY PANELS

(75) Inventor: Ajit Ninan, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 13/993,181

(22) PCT Filed: Dec. 14, 2011

(86) PCT No.: PCT/US2011/064783
§ 371 (c)(1),
(2), (4) Date: Jun. 11, 2013

(87) PCT Pub. No.: WO2012/082825
PCT Pub. Date: Jun. 21, 2012

(65) Prior Publication Data
US 2013/0265343 A1    Oct. 10, 2013

Related U.S. Application Data

(60) Provisional application No. 61/424,199, filed on Dec. 17, 2010, provisional application No. 61/448,599, (Continued)

(51) Int. Cl.
*G09G 5/10* (2006.01)
*G09G 3/22* (2006.01)
(Continued)

(52) U.S. Cl.
CPC . *G09G 3/22* (2013.01); *F21K 9/64* (2016.08); *G09G 3/001* (2013.01); *G09G 3/003* (2013.01);
(Continued)

(58) Field of Classification Search
CPC ........... G09G 3/02; G09G 3/025; B82Y 20/00; G02F 1/133617; G02F 2202/36; G02F 2001/01791; H04N 9/3129
(Continued)

(56) References Cited

U.S. PATENT DOCUMENTS 5,090,794 A    2/1992    Hatano
5,138,441 A    8/1992    Tanaka
(Continued)

FOREIGN PATENT DOCUMENTS

CN    1732717    2/2006
CN    1841471    10/2006
(Continued)

OTHER PUBLICATIONS

NanocoTechnologies "The Future of Cadmium Free QD Display Technology" Apr. 2011.
(Continued)

*Primary Examiner* — Temesghen Ghebretinsae
*Assistant Examiner* — Michael J Jansen, II

(57) ABSTRACT

Techniques for rendering images directly with light conversion materials are described. In some embodiments, image data for one or more image frames is received. A light source may be controlled to emit first light to irradiate a light conversion material disposed with an image rendering surface. Second light that renders the one or more image frames may be emitted from the light conversion material. The second light emitted from the light conversion material may be excited by the first light. A display system under techniques herein may be free of a light valve layer on which light transmittance is modulated on a pixel-by-pixel basis.

17 Claims, 6 Drawing Sheets

Related U.S. Application Data filed on Mar. 2, 2011, provisional application No. 61/486,160, filed on May 13, 2011, provisional application No. 61/486,166, filed on May 13, 2011, provisional application No. 61/486,171, filed on May 13, 2011.

(51) Int. Cl.

| | | |
|---|---|---|
| *G09G 3/00* | (2006.01) | |
| *G09G 3/02* | (2006.01) | |
| *G09G 5/14* | (2006.01) | |
| G09G 3/34 | (2006.01) | |
| H04N 9/31 | (2006.01) | |
| B82Y 20/00 | (2011.01) | |
| G02B 27/22 | (2006.01) | |
| F21V 9/08 | (2006.01) | |
| G02B 26/08 | (2006.01) | |

(52) U.S. Cl.
CPC ............. *G09G 3/02* (2013.01); *G09G 3/025* (2013.01); *G09G 5/14* (2013.01); *B82Y 20/00* (2013.01); *F21V 9/08* (2013.01); *G02B 26/08* (2013.01); *G02B 27/2207* (2013.01); *G02B 27/2264* (2013.01); *G09G 3/34* (2013.01); *G09G 2310/0235* (2013.01); *H04N 9/3129* (2013.01)

(58) Field of Classification Search
USPC ......................................................... 345/690
See application file for complete search history.

(56) References Cited

U.S. PATENT DOCUMENTS

| | | | |
|---|---|---|---|
| 5,666,174 A | 9/1997 | Cupolo, III | |
| 5,731,794 A | 3/1998 | Miyazawa | |
| 5,754,159 A | 5/1998 | Wood | |
| 5,774,257 A | 6/1998 | Shibata | |
| 5,920,361 A * | 7/1999 | Gibeau et al. ................. 348/750 | |
| 6,031,328 A | 2/2000 | Nakamoto | |
| 6,470,115 B1 | 10/2002 | Yonekubo | |
| 6,608,439 B1 | 8/2003 | Sokolik | |
| 6,864,626 B1 | 3/2005 | Weiss | |
| 7,126,254 B2 | 10/2006 | Nanataki | |
| 7,230,603 B2 | 6/2007 | Yamamoto | |
| 7,242,030 B2 * | 7/2007 | Wang ..................... B82Y 10/00 | |
| | | | 257/100 |
| 7,272,275 B2 * | 9/2007 | Spoonhower ...... G02B 6/12004 | |
| | | | 345/55 |
| 7,326,908 B2 * | 2/2008 | Sargent ................. B82Y 10/00 | |
| | | | 250/214.1 |
| 7,420,323 B2 | 9/2008 | Krummacher | |
| 7,430,022 B2 | 9/2008 | Hekstra | |
| 7,465,104 B2 | 12/2008 | Tokui | |
| 7,471,706 B2 * | 12/2008 | Bass ..................... G02B 27/017 | |
| | | | 372/1 |
| 7,481,562 B2 | 1/2009 | Chua | |
| 7,486,854 B2 | 2/2009 | Van Ostrand | |
| 7,537,947 B2 | 5/2009 | Smith | |
| 7,649,594 B2 | 1/2010 | Kim | |
| 7,686,493 B2 | 3/2010 | Roshan | |
| 7,696,684 B2 | 4/2010 | Weiss | |
| 7,733,017 B2 | 6/2010 | Shapiro | |
| 7,746,423 B2 | 6/2010 | Im | |
| 7,751,663 B2 | 7/2010 | Van Ostrand | |
| 7,768,023 B2 | 8/2010 | Diana | |
| 7,858,409 B2 | 12/2010 | Kessels | |
| 7,982,812 B2 | 7/2011 | Rho | |
| 7,988,311 B2 | 8/2011 | Helbing | |
| 8,026,661 B2 | 9/2011 | Weiss | |
| 8,029,139 B2 * | 10/2011 | Ellinger ............. G02B 27/2207 | |
| | | | 353/10 |
| 8,035,772 B2 | 10/2011 | Kim | |
| 8,075,148 B2 | 12/2011 | Nada | |
| 8,164,820 B2 | 4/2012 | Cho | |
| 8,203,785 B2 * | 6/2012 | Kindler .................. G03B 21/56 | |
| | | | 345/84 |
| 8,210,701 B2 | 7/2012 | Igarashi | |
| 8,215,815 B2 | 7/2012 | Meir | |
| 8,232,957 B2 * | 7/2012 | Hajjar ...................... G09G 3/02 | |
| | | | 345/102 |
| 8,233,217 B2 * | 7/2012 | Kindler .................. G03B 21/56 | |
| | | | 345/84 |
| 8,242,679 B2 | 8/2012 | Noh | |
| 8,248,396 B2 * | 8/2012 | Konicek .............. G06K 9/0004 | |
| | | | 345/156 |
| 8,269,260 B2 * | 9/2012 | Tian .................. H01L 27/14603 | |
| | | | 257/226 |
| 8,294,168 B2 | 10/2012 | Park | |
| 8,455,904 B2 * | 6/2013 | Schardt ................. H01L 27/156 | |
| | | | 257/98 |
| 8,508,830 B1 * | 8/2013 | Wang .................... G02B 3/0006 | |
| | | | 359/267 |
| 8,684,546 B2 * | 4/2014 | Ninan ................. G02B 27/2264 | |
| | | | 362/612 |
| 8,693,087 B2 * | 4/2014 | Nowatzyk ............... G02F 1/167 | |
| | | | 349/33 |
| 8,698,713 B2 * | 4/2014 | Hajjar .................. G03B 21/567 | |
| | | | 345/32 |
| 8,773,453 B2 | 7/2014 | Ninan | |
| 8,809,811 B2 * | 8/2014 | Ralli ...................... G02B 5/201 | |
| | | | 250/488.1 |
| 9,010,949 B2 * | 4/2015 | Ninan ................. G02B 27/2264 | |
| | | | 362/249.02 |
| 9,217,862 B2 * | 12/2015 | Hajjar .................. G02B 26/123 | |
| 9,222,629 B2 * | 12/2015 | Ninan ................. G02B 27/2264 | |
| 2001/0008395 A1 | 7/2001 | Yamamoto | |
| 2003/0117546 A1 | 6/2003 | Conner | |
| 2004/0061708 A1 | 4/2004 | Oh | |
| 2005/0236556 A1 * | 10/2005 | Sargent .................. B82Y 10/00 | |
| | | | 250/214.1 |
| 2005/0269950 A1 | 12/2005 | Giraldo | |
| 2006/0056197 A1 | 3/2006 | Robinson | |
| 2006/0103589 A1 | 5/2006 | Chua | |
| 2006/0109682 A1 | 5/2006 | Ko | |
| 2006/0121371 A1 | 6/2006 | Wu | |
| 2006/0132472 A1 * | 6/2006 | Peeters ..................... G09G 3/02 | |
| | | | 345/204 |
| 2006/0145137 A1 * | 7/2006 | Wang ..................... B82Y 10/00 | |
| | | | 257/14 |
| 2006/0214903 A1 * | 9/2006 | Kurosaka ............... B82Y 10/00 | |
| | | | 345/102 |
| 2006/0221012 A1 | 10/2006 | Ikeda | |
| 2006/0221021 A1 * | 10/2006 | Hajjar et al. ..................... 345/84 | |
| 2006/0221022 A1 * | 10/2006 | Hajjar ............................. 345/84 | |
| 2006/0222286 A1 * | 10/2006 | Spoonhower ...... G02B 6/12004 | |
| | | | 385/15 |
| 2006/0227087 A1 * | 10/2006 | Hajjar ...................... G09G 3/02 | |
| | | | 345/84 |
| 2006/0238103 A1 | 10/2006 | Choi | |
| 2006/0244367 A1 | 11/2006 | Im | |
| 2007/0014318 A1 * | 1/2007 | Hajjar ..................... B82Y 10/00 | |
| | | | 372/9 |
| 2007/0029560 A1 | 2/2007 | Su | |
| 2007/0046176 A1 * | 3/2007 | Bukesov ................. C09K 11/08 | |
| | | | 313/496 |
| 2007/0096141 A1 | 5/2007 | Chen | |
| 2007/0242028 A1 | 10/2007 | Kitagawa | |
| 2007/0247573 A1 | 10/2007 | Ouderkirk | |
| 2007/0268240 A1 | 11/2007 | Lee | |
| 2008/0007172 A1 | 1/2008 | Tan | |
| 2008/0136758 A1 | 6/2008 | Ohta | |
| 2008/0172197 A1 | 7/2008 | Skipor | |
| 2008/0204366 A1 * | 8/2008 | Kane ......................... H05B 33/10 | |
| | | | 345/44 |
| 2008/0215279 A1 | 9/2008 | Salsbury | |
| 2008/0225520 A1 | 9/2008 | Garbus | |
| 2008/0230795 A1 | 9/2008 | Dias | |
| 2008/0291140 A1 * | 11/2008 | Kent ..................... G03B 21/567 | |
| | | | 345/83 |

(56) References Cited

U.S. PATENT DOCUMENTS

| | | | |
|---|---|---|---|
| 2009/0034292 A1 | 2/2009 | Pokrovskiy | |
| 2009/0039448 A1 | 2/2009 | Chuang | |
| 2009/0059554 A1 | 3/2009 | Skipor | |
| 2009/0091689 A1 | 4/2009 | Rho | |
| 2009/0109517 A1 | 4/2009 | Cho | |
| 2009/0146933 A1 | 6/2009 | Visser | |
| 2009/0152664 A1* | 6/2009 | Klem | H01L 27/14603 257/440 |
| 2009/0153582 A1* | 6/2009 | Hajjar | G09G 3/02 345/592 |
| 2009/0162011 A1 | 6/2009 | Coe-Sullivan | |
| 2009/0174632 A1* | 7/2009 | Hajjar | G09G 3/02 345/81 |
| 2009/0180055 A1 | 7/2009 | Kim | |
| 2009/0190095 A1 | 7/2009 | Ellinger | |
| 2009/0194774 A1 | 8/2009 | Huang | |
| 2009/0196014 A1 | 8/2009 | Hsiao | |
| 2009/0231831 A1 | 9/2009 | Hsiao | |
| 2010/0079704 A1 | 4/2010 | Cho | |
| 2010/0084674 A1 | 4/2010 | Paetzold | |
| 2010/0102251 A1 | 4/2010 | Ferrini | |
| 2010/0102340 A1 | 4/2010 | Ooya | |
| 2010/0117997 A1 | 5/2010 | Haase | |
| 2010/0123155 A1 | 5/2010 | Pickett | |
| 2010/0123839 A1 | 5/2010 | Lu | |
| 2010/0155749 A1 | 6/2010 | Chen | |
| 2010/0172138 A1 | 7/2010 | Richardson | |
| 2010/0177091 A1 | 7/2010 | Hioki | |
| 2010/0187404 A1* | 7/2010 | Klem | H01L 27/14603 250/208.1 |
| 2010/0187408 A1* | 7/2010 | Klem | H01L 27/14603 250/214.1 |
| 2010/0193806 A1 | 8/2010 | Byun | |
| 2010/0207865 A1 | 8/2010 | Auld | |
| 2010/0208172 A1 | 8/2010 | Jang | |
| 2010/0208493 A1 | 8/2010 | Choi | |
| 2010/0214282 A1 | 8/2010 | Whitehead | |
| 2010/0246160 A1 | 9/2010 | Ito | |
| 2010/0283036 A1 | 11/2010 | Coe-Sullivan | |
| 2010/0283072 A1 | 11/2010 | Kazlas | |
| 2010/0289819 A1* | 11/2010 | Singh et al. | 345/619 |
| 2011/0057866 A1* | 3/2011 | Konicek | G06K 9/0004 345/82 |
| 2011/0109529 A1* | 5/2011 | Hajjar | G03B 21/567 345/32 |
| 2011/0141150 A1* | 6/2011 | Hajjar | B82Y 10/00 345/690 |
| 2011/0176328 A1 | 7/2011 | Anandan | |
| 2011/0205251 A1 | 8/2011 | Auld | |
| 2011/0291554 A1* | 12/2011 | Bukesov | C09K 11/08 313/504 |
| 2011/0298820 A1* | 12/2011 | Hajjar | G02B 26/123 345/619 |
| 2011/0299011 A1 | 12/2011 | Weiss | |
| 2011/0312116 A1 | 12/2011 | Weiss | |
| 2011/0317097 A1 | 12/2011 | Kim | |
| 2012/0037885 A1* | 2/2012 | Schardt | H01L 27/156 257/13 |
| 2012/0038286 A1 | 2/2012 | Hasnain | |
| 2012/0050632 A1 | 3/2012 | Shih | |
| 2012/0154417 A1 | 6/2012 | Ninan | |
| 2012/0154422 A1 | 6/2012 | Ninan | |
| 2012/0154464 A1 | 6/2012 | Ninan | |
| 2012/0155060 A1 | 6/2012 | Ninan | |
| 2012/0200734 A1* | 8/2012 | Tang | H04N 5/23245 348/223.1 |
| 2012/0250351 A1* | 10/2012 | Shin | G02F 1/133603 362/608 |
| 2012/0262601 A1* | 10/2012 | Choi | H04N 5/3696 348/223.1 |
| 2012/0274882 A1 | 11/2012 | Jung | |
| 2012/0287381 A1 | 11/2012 | Li | |
| 2012/0300465 A1 | 11/2012 | Chang | |
| 2013/0003163 A1* | 1/2013 | Nowatzyk | G02F 1/167 359/296 |
| 2013/0050293 A1 | 2/2013 | Feng | |
| 2013/0201661 A1* | 8/2013 | Mehrle | 362/97.1 |
| 2013/0215136 A1 | 8/2013 | Jiao | |
| 2013/0328948 A1* | 12/2013 | Kunkel | G09G 3/22 345/690 |
| 2013/0335677 A1 | 12/2013 | You | |
| 2013/0342558 A1 | 12/2013 | Sasaki | |
| 2014/0035960 A1* | 2/2014 | You | G09G 3/3413 345/690 |
| 2014/0071684 A1* | 3/2014 | Ralli | G02B 5/201 362/260 |
| 2014/0098515 A1* | 4/2014 | Pickett | G09F 13/02 362/23.13 |
| 2014/0126180 A1* | 5/2014 | Ninan | G02B 27/2264 362/84 |
| 2014/0293392 A1* | 10/2014 | Ninan | G02B 27/2264 359/222.1 |
| 2015/0184814 A1* | 7/2015 | Ninan | G02B 27/2264 362/84 |
| 2015/0287368 A1* | 10/2015 | Ninan | G09G 3/32 345/690 |
| 2015/0294630 A1* | 10/2015 | Whitehead | G09G 3/3426 345/690 |
| 2015/0339996 A1* | 11/2015 | Schuck | G02F 1/133603 348/58 |
| 2016/0112686 A1* | 4/2016 | Hajjar | G02B 26/123 348/756 |

FOREIGN PATENT DOCUMENTS

| | | |
|---|---|---|
| CN | 1841487 | 10/2006 |
| CN | 201062757 | 5/2008 |
| CN | 101243557 | 8/2008 |
| CN | 101322247 | 12/2008 |
| EP | 1579733 | 9/2005 |
| EP | 1922763 | 5/2008 |
| EP | 2365384 | 9/2011 |
| JP | 2-78393 | 3/1990 |
| JP | 2004-325647 | 11/2004 |
| JP | 2005-258248 | 9/2005 |
| JP | 2007-058209 | 3/2007 |
| JP | 2008-096547 | 4/2008 |
| JP | 2008-538145 | 10/2008 |
| JP | 2009-251129 | 10/2009 |
| KR | 2000-0014574 | 3/2000 |
| KR | 2002-0045461 | 6/2002 |
| KR | 10-2005-0021548 | 3/2005 |
| KR | 10-2005-0046816 | 5/2005 |
| KR | 2007-0024893 | 3/2007 |
| KR | 2008-0041780 | 5/2008 |
| KR | 10-2010-0039910 | 4/2010 |
| KR | 2011-0012246 | 2/2011 |
| KR | 2011-0072210 | 6/2011 |
| KR | 2012-0078883 | 7/2012 |
| KR | 2013-0000506 | 1/2013 |
| RU | 2456660 | 7/2012 |
| WO | 03/058726 | 7/2003 |
| WO | 2004/060024 | 7/2004 |
| WO | 2006/107720 | 10/2006 |
| WO | 2007/020556 | 2/2007 |
| WO | 2007/114918 | 10/2007 |
| WO | 2009/041574 | 4/2009 |
| WO | 2009/041594 | 4/2009 |
| WO | 2009/078426 | 6/2009 |
| WO | 2009/101727 | 8/2009 |
| WO | 2010/058162 | 5/2010 |
| WO | 2011/031802 | 3/2011 |
| WO | 2012/082825 | 6/2012 |

OTHER PUBLICATIONS

Quantum Dot LCD HDTV, Dec. 31, 2009.
Nanosys and LG Close to Bringing Quantun Dot Technology to LCD Displays, Nov. 4, 2010.

(56) References Cited

OTHER PUBLICATIONS

Green, Kate, "How Quantum Dots Will Make LCDs Better", Dec. 9, 2009, QD Vision.

* cited by examiner

QUANTUM DOTS FOR DISPLAY PANELS

CROSS-REFERENCE TO RELATED APPLICATIONS

This application is related to, and claims benefit of, Provisional U.S. Patent Application No. 61/424,199 filed on Dec. 17, 2010, by Ajit Ninan entitled "QUANTUM DOT MODULATION FOR DISPLAYS" and assigned to the assignee of the present invention; Provisional U.S. Patent Application No. 61/448,599 filed on Mar. 2, 2011, by Ajit Ninan entitled "N-MODULATION FOR WIDE COLOR GAMUT AND HIGH BRIGHTNESS" and assigned to the assignee of the present invention, which are hereby incorporated herein by reference for all purposes as if fully set forth herein.

This application is related to, and claims benefit of, Provisional U.S. Patent Application No. 61/486,160 filed on May 13, 2011, by Ajit Ninan entitled "TECHNIQUES FOR QUANTUM DOTS" and assigned to the assignee of the present invention; Provisional U.S. Patent Application No. 61/486,166 filed on May 13, 2011, by Ajit Ninan entitled "TECHNIQUES FOR QUANTUM DOT ILLUMINATION" and assigned to the assignee of the present invention, which are hereby incorporated herein by reference for all purposes as if fully set forth herein.

TECHNOLOGY

The present invention relates generally to display techniques, and in particular, to quantum-dot display techniques.

BACKGROUND

A display system may contain light valves (e.g., LCD) and color filters (e.g., imparting red, green and blue colors in a RGB system) that regulate brightness levels and color values of pixels as the pixels are being illuminated by a light source, such as back light units (BLUs). Typically, light sources such as fluorescent lights or light-emitting diodes (LEDs) illuminate pixels on display panels. The light illuminating the pixels is attenuated by RGB color filters and liquid crystal materials.

Engineering a display system with wide color gamut and high luminance has been recognized as a very difficult endeavor by many display manufactures. Furthermore, because of a high number of relatively expensive optical, audio, electronic and mechanical components involved and complexity in integrating all of them in a single system, the cost of manufacturing a decent display system is typically very high.

Since a typical display system comprises many passive light filtering components, much (e.g., over 95%) of the light generated by a light source in the display system is not only inefficiently wasted but also converted into harmful heat which degrades the performance and lifetime of the display system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE POSSIBLE EMBODIMENTS

Figure 1A:
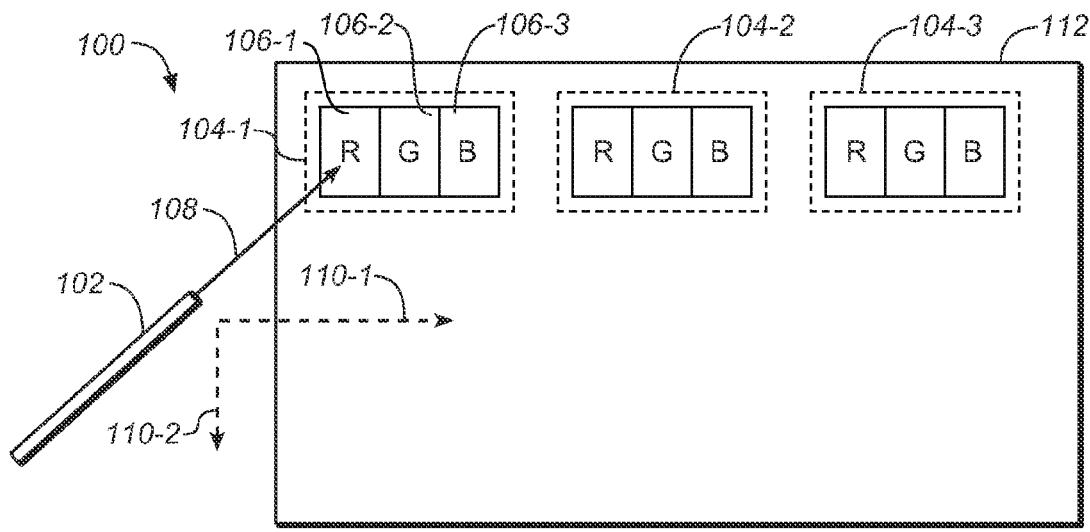
FIG. 1A, FIG. 1D and FIG. 1E illustrate different example configurations of a display system, in accordance with some possible embodiments of the present invention.

Example possible embodiments, which relate to quantum-dot (QD) based display techniques, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. STRUCTURE OVERVIEW
3. IMAGE RENDERING SURFACE
4. COLOR FILTERS
5. SEPARATELY MODULATED LIGHT BEAMS
6. 3D DISPLAYS
7. LIGHT SOURCE CONTROL LOGIC
8. EXAMPLE PROCESS FLOW
9. IMPLEMENTATION MECHANISMS—HARDWARE OVERVIEW

10. EQUIVALENTS, EXTENSIONS, ALTERNATIVES AND MISCELLANEOUS

1. General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

Under techniques as described herein, light conversion materials such as quantum dots, quantum wells, etc. that emit second light upon irradiation by first light may be directly used to form a display panel.

In some embodiments, the second light renders images without being subject to light modulation by a pixel-by-pixel light modulation (or valve) layer (e.g., LCD display panels). Under techniques as described herein, a display system may be formed without a light valve layer such as a LCD layer and may be produced without an expensive manufacturing process that would otherwise be required in order to create complicated pixel or sub-pixel structures that perform pixel-by-pixel light modulation with light modulation materials such as liquid crystal materials.

A display panel as described herein may be easily formed on a wide variety of support materials. Under techniques as described herein, an image rendering surface may be formed anywhere a light conversion material may be deposited/disposed. For example, an image rendering surface can be coupled to, integrated with, adjacent to, etc. a mechanical structure that is disposed with a light conversion material. In some possible embodiments, an image rendering surface may be mechanically coupled with a structure that hosts a light conversion material. In some other possible embodiments, an image rendering surface may not be mechanically coupled with such a structure; for example, in some embodiments, the light conversion materials may be disposed apart from the image rendering surface. In some embodiments, there may be intervening optical structures/components between an image rendering surface and a light conversion material. In some other embodiments, there may not be such intervening optical structures/components; for example, both the image rendering surface and the light conversion materials may present in the same optical structures/components. In an example, light conversion materials may be coated to a support surface provided by glass, plastics, canvas, paper, an optical grade material, an opaque support material, etc., giving rise to an image rendering surface near or at the support surface. In another example, light conversion materials may be embedded within optically transparent materials such as glass, plastics, etc., giving rise to an image rendering surface near or at the optically transparent materials. A display panel as described herein may be deployed or used in many different places. For example, such a display panel may be easily set up or erected in a stadium, concert, a large room, a small office, a home, a park, a vehicle, an outdoor or indoor location, etc.

It should be noted that light conversion materials as described herein may be excited or irradiated with coherent light such as from a laser source. In some embodiments, image rendering is accomplished with non-coherent light emitted from light conversion materials. Image rendering with non-coherent light may provide a display system with an excellent wide viewing angle, as compared with images formed by coherent light such as laser light.

In some embodiments, light conversion materials of different color types may be used to form a display panel as described herein. For example, the display panel may be attached with a film, coated or deposited, with quantum dots of different color types in an unmixed pattern or alternatively in a mixed state/form. Each pixel may comprise two, three, or more types of quantum dots, each type of which is configured to generate a different color light. Different types of quantum dots may be responsive to different types (e.g., wavelengths) of input light. A light source such as a laser may illuminate the quantum dots with different types (wavelengths) of first light to cause second light of different colors to be emitted. The intensity of the illumination by the different types of first light may vary for different pixels or sub-pixels based on image data. For example, if a pixel is to express a red color, the intensity of the type of first light to excite the red quantum dots may be set to a non-zero value, while the intensity of other types of the first light to excite the blue and green quantum dots may be set to zero. The first light may sweep though all pixels in the display panel to form an image directly rendered by the quantum dots without any light modulation/valve layer (e.g., LCD layer). The light source emitting the first light may be placed anywhere including front, back, side or another location relative to the display panel. For example, the light source may be located at a top front position relative to the display panel.

In some embodiments, light conversion materials that are responsive to specific wavelength of first light (excitation light) may be used in a display system as described herein. For example, input narrowband quantum dots of different color types, which are sensitive to different input light frequencies/wavelengths respectively, may be used to directly form a display panel. Input narrowband red quantum dots may be sensitive to a first light wavelength range. Input narrowband green quantum dots may be sensitive to a second light wavelength range. Input narrowband blue quantum dots may be sensitive to a third light wavelength range. The first, second, and third light wavelength ranges may be substantially or imperceptibly non-overlapping. As used herein, imperceptible non-overlapping in the context of input narrowband quantum dots may refer to overlapping of wavelengths in first (e.g., input) light that does not generate visual artifacts in second light, as generated based on the first light, perceptible to a viewer. Light sources emitting first light in these three light wavelength ranges may be used to illuminate/excite the input narrowband quantum dots to produce second light of different colors. The intensities of the illuminations of the first light in these embodiments may vary for different pixels based on image data containing images to be rendered by the display system. The first light may sweep though the display panel to form an image directly by the input narrowband quantum dots. The light sources may be placed anywhere including front, back, side or another location relative to the display panel.

In some embodiments, output narrowband quantum dots may be used to create a three dimensional (3D) display system. Left-perspective and right-perspective image frames may be viewed through a pair of passive glasses without synchronizing the glasses with the 3D display system. Each pixel may comprise a first set of red, green and blue quantum dots and a second set of red, green and blue quantum dots. Each set of quantum dots may independently support rendering images. The first set of quantum dots may be only sensitive to a first set of wavelength ranges in first light emitted by a light source, while the second set of quantum dots may be only sensitive to a second set of wavelength ranges in the first light emitted by the light source. Light wavelengths generated by the first set of quantum dots may be substantially or imperceptibly non-overlapping with light wavelengths generated by the second set of quantum dots. As used herein, imperceptible non-overlapping in the context of output narrowband quantum dots may refer to overlapping of wavelengths in second (e.g., output) light that does not generate visual artifacts in the second light perceptible to a viewer. Intensity of first light in individual wavelengths and/or individual wavelength ranges may be individually controllable to modulate the first light incident on pixels based on image data.

A right image frame may be rendered by second light generated by the first set of quantum dots illuminated with first light in the first set of wavelength ranges, while a left image frame may be rendered by second light generated by the second set of quantum dots illuminated with first light in the first set of wavelength ranges. The quantum dots may be patterned, partially mixed, or fully mixed. The right perspective of a viewer's 3D glasses as mentioned above may be transmissive to the light wavelengths in the second light generated by the first set of quantum dots but opaque to the light wavelengths in the second light generated by the second set of quantum dots. Conversely, the left perspective of the viewer's 3D glasses may be transmissive to the light wavelengths in the second light generated by the second set of quantum dots but opaque to the light wavelengths in the second light generated by the first set of quantum dots.

In some embodiments, right image frames and left image frames may be rendered in a frame sequential manner.

In some embodiments, a method comprises providing a display system as described herein. In some possible embodiments, mechanisms as described herein form a part of a display system, including but not limited to a handheld device, game machine, television, laptop computer, netbook computer, cellular radiotelephone, electronic book reader, point of sale terminal, desktop computer, computer workstation, computer kiosk, PDA and various other kinds of terminals and display units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Structure Overview

FIG. 1A illustrates an example display system 100, according to an embodiment of the invention. Display system 100 comprises a light source 102 and a plurality of pixels, e.g., 104-1, 104-2, 104-3, etc. The plurality of pixels may be arranged in a two-dimensional array in a geometric shape. Examples of geometric shape the pixels may form include but are not limited only to rectangular shape, triangular shape, elliptic shape, polygonal shape, etc.

In some embodiments, a pixel (e.g., 104-1) as described herein may comprise three or more sub-pixels (e.g., 106-1, 106-2 and 106-3). The sub-pixels (106-1, 106-2 and 106-3) in the pixel (104-1) may be arranged as a single point or a single blot, or in a linear or non-linear pattern.

In some embodiments, light source 102 emits a light beam (e.g., 108) that irradiates the plurality of pixels. Light beam 108 may be visible light (e.g., blue light) or may be invisible light (e.g., ultraviolet light). Light beam 108 may also be, but is not limited only to, coherent light which maintains a relatively small effective irradiation area on an image rendering surface (e.g., 112) at which the plurality of pixels are located. As used herein, an effective irradiation area may refer to an area within which intensity of light (e.g., from light beam 108) is above a certain threshold of intensity, while intensity of the light leaking outside the effective irradiation area is below the threshold.

A pixel (e.g., 104-1) as described herein may comprise a portion of a light conversion material. Examples of light conversion materials as described herein may be, but are not limited to, quantum dots, quantum wells, or another material that receives energy from irradiation and converts the energy into light. For the purpose of illustration only, quantum dots are used as an example of light conversion material. For brevity, light from light source 102 is denoted as first light, while light generated by the light conversion material upon irradiation of the first light is denoted as second light. When the pixel (104-1) is irradiated by first light from light source 102, quantum dots in the pixel (104-1) are excited and in turn produce second light. The second light emitted by the quantum dots in the pixel (104-1) may be proportional to the strength of the first light incident on the pixel (104-1).

Each of the sub-pixels (106-1, 106-2 and 106-3) may be configured to impart a specific color of three or more primary colors. For example, sub-pixel 106-1 may comprise a first type of quantum dots (red quantum dots) that emit red second light when excited by a first light, sub-pixel 106-2 may comprise a second type of quantum dots (green quantum dots) that emit green second light when excited by a first light, and sub-pixel 106-3 may comprise a third type of quantum dots (blue quantum dots) that emit blue second light when excited by a first light. In some possible embodiments, more types of sub-pixels may be configured other than three primary colors. For example, a sub-pixel that is configured to emit a saturated violet color may be additionally a part of a pixel as described herein.

In some embodiments, the first light from light source 102 sequentially scans the plurality of pixels. Scanning of the plurality of pixels may be performed in a pattern in rendering an image. The pattern may be linear, or non-linear. In a particular embodiment, the scanning may be performed first by scanning a linear pattern along one (e.g., 110-1) of two sweeping directions (e.g., 110-1 and 110-2) and by moving to scan the next linear pattern along the other (e.g., 110-2) of the two sweeping directions (110-1 and 110-2).

The intensity of the first light irradiating one pixel may be different from the intensity of the first light irradiating another pixel. Under techniques described herein, intensities of the first light from light source 102 are determined on the basis of the smallest individual display units in the display system (100) based on image data received by the display system (100). A smallest individual display unit as described herein may be a pixel or a sub-pixel in a pixel.

For example, in embodiments in which pixels are the smallest individual display units, the image data may indicate that a first pixel is to express a first luminance level and that a second pixel is to express a second different luminance level. Accordingly, when light beam 108 is irradiating the first pixel, the intensity of the first light may be set to a first value commensurate with the first luminance level; on the other hand, when light beam 108 is irradiating the second different pixel, the intensity of the first light may be set to a first value commensurate with the second luminance level.

Similarly, in embodiments in which sub-pixels are the smallest individual display units, the image data may indicate that a first sub-pixel (106-1) in a pixel (104-1) is to express a first color value (100 for red) and that a second sub-pixel (106-2) in a pixel (which may be also 104-1) is to express a second color value (which may or may not be red, for example, 50 for green). Accordingly, when light beam 108 is irradiating the first sub-pixel (106-1), the intensity of the first light may be set to a first value commensurate with the first color value (100 for red); on the other hand, when light beam 108 is irradiating the second sub-pixel (106-2), the intensity of the first light may be set to a second value commensurate with the second color value.

In some embodiments, light source 102 may comprise an electronic-optic-mechanical system comprising one or more of motors, mirrors, lenses, optical masks, collimators, or other electronic, optical or mechanical elements which cooperate to deliver first light to the light conversion material at or near the image rendering surface (112).

Display system 100 may be a color display system. This may be achieved in various ways including: using a pattern of light conversion units (e.g., with color quantum dots) each emitting light of a specific color; using a mixture of different colors/types of quantum dots for a pixel with each color/type of quantum dot emitting a specific color in response to irradiation of first light in specific wavelength range; using a mixture of quantum dots that emit white light with dye-based only, quantum-dot-based only, part-dye-part quantum-dot-based color filters, etc.

3. Image Rendering Surface

Figure 1B:
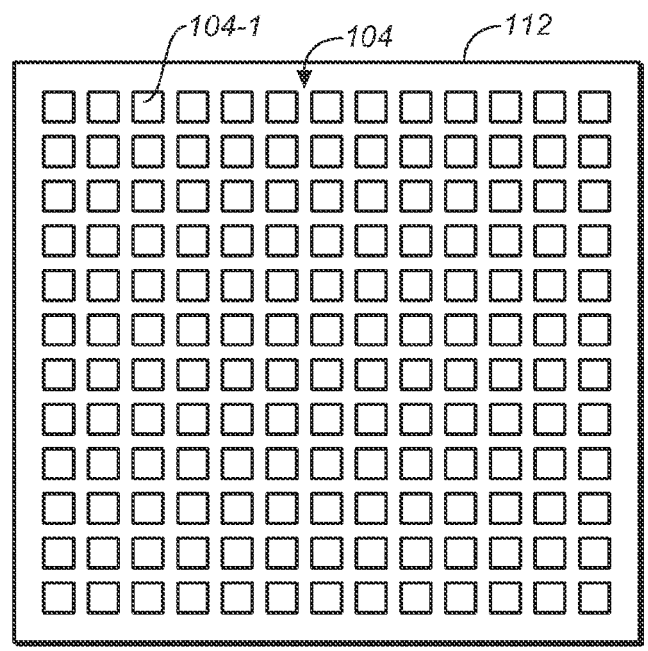
FIG. 1B illustrates an example image rendering surface comprising a plurality of pixels in a top view, in accordance with some possible embodiments of the present invention.

FIG. 1B illustrates an example image rendering surface (e.g., 112) comprising a plurality of pixels (e.g., 104) in a top view, in accordance with some possible embodiments of the present invention. A plurality of pixels as described herein may comprise a light conversion material and may be arranged in a geometric pattern such as a rectangle as illustrated. Another geometric pattern such as an ellipse, triangle, quadrilateral, etc., or a combination thereof, may also be used to arrange the pixels on an image rendering surface as described herein.

Figure 2A:
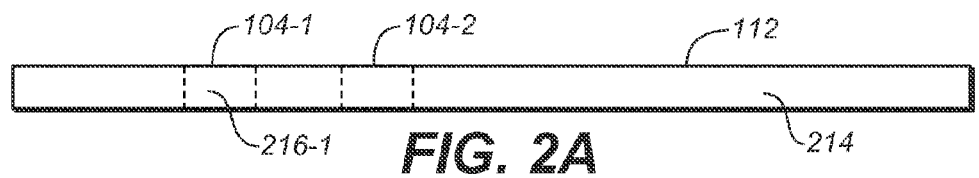
FIG. 2A and FIG. 2B illustrate different example configurations of an image rendering surface comprising a plurality of pixels in a side view, in accordance with some possible embodiments of the present invention.

FIG. 2A illustrates an example image rendering surface (e.g., 112) comprising a plurality of pixels (which include, for example, 104-1 and 104-2) in a side view, in accordance with some possible embodiments of the present invention. As used herein, an image rendering surface may refer to a physical or imaginary surface on which images rendered by the light conversion material may be perceived by a viewer; the image rendering surface may be flat, bent, curved, etc. The term "imaginary" here is used in a similar sense to how the term is used in a phrase of "an imaginary axis of symmetry for a symmetric object"; the imaginary axis of symmetry may or may not be physically delineated on the symmetric object but nevertheless the imaginary axis may be perceived by a viewer. In some embodiments, the image rendering surface (112) is the top surface of an optical layer (e.g., 214). The optical layer (214) may be, but is not limited to, a layer of optical material that hosts the light conversion material. Examples of optical layers as described herein include, but are not limited only to, a film, a sheet, a substrate layer, etc. Thickness of the optical layer (214) may range from nanometer, tens of nanometers, etc. to millimeter, centimeter, or thicker. One or more surfaces of the optical layer (214) may be laminated or not laminated depends on display applications. A pixel (e.g., 104-1) as described herein may comprise a portion (e.g., 216-1) of a light conversion material such as quantum dots.

Figure 2B:
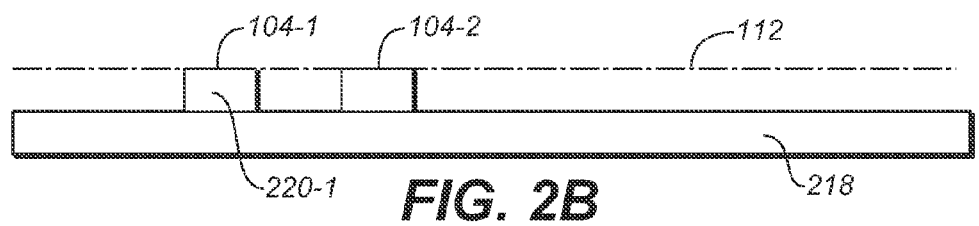

FIG. 2B illustrates another example image rendering surface (e.g., 112) comprising a plurality of pixels (which include, for example, 104-1 and 104-2) in a side view, in accordance with some possible embodiments of the present invention. In some embodiments, a plurality of discrete, non-contiguous 3 dimensional shapes (one of which is, for example, 220-1) may be disposed in an array on a support layer (218). The light conversion material such as quantum dots may be disposed with each of the 3 dimensional shapes. A pixel (e.g., 104-1) in FIG. 2B may refer to the top surface of such a 3 dimensional shape (e.g., 220-1). In these embodiments, the image rendering surface (112) may be formed by extending top surfaces of the 3 dimensional shapes. As used herein, a support layer (e.g., 218) as described herein may be, but is not limited to, any backing layer to which shapes with the light conversion material may be disposed. Examples of support layers as described herein include, but are not limited only to, a rigid or flexible backing material made up of paper, canvas, textile, plastics, metal sheet, or other materials. Physical properties such as thickness, weight, rigidity, elasticity, etc., of the support layer (218) may vary depending on display applications. Additionally and/or optionally, the pixels (214) may be laminated or not laminated depending on display applications. Additionally and/or optionally, the pixels (214) may be immersed or not immersed in a filling material (e.g., a transparent resin, glass, etc.) depending on display applications.

Figure 2C:
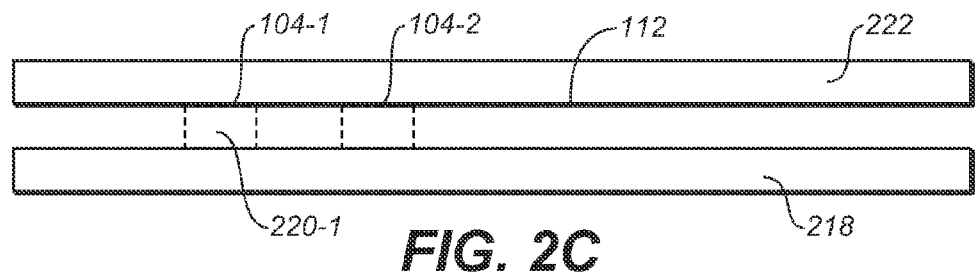
FIG. 2C illustrates an example configuration in which a plurality of pixels is sandwiched between two support layers in a side view, in accordance with some possible embodiments of the present invention.

FIG. 2C illustrates an example configuration in which a plurality of pixels (which include, for example, 104-1 and 104-2) is sandwiched between two support layers (or substrates; 218 and 222) in a side view, in accordance with some possible embodiments of the present invention. In some embodiments, a light conversion material such as quantum dots may be disposed in an array between the support layers (218 and 222). An image rendering surface (e.g., 112) in FIG. 2C may refer to the bottom surface of the top support layer (e.g., 222). Two support layers may be made of the same material, or may be made of different materials. Physical properties such as thickness, weight, rigidity, elasticity, etc. of a support layer as described herein may vary depending on display applications. Additionally and/or optionally, the pixels (214) may be immersed or not immersed in a filling material (e.g., a transparent resin, glass, etc.) depending on display applications.

4. Color Filters

In some embodiments, second light from the light conversion material such as quantum dots directly renders a color image without color filters. For example, unit structures comprising different color quantum dots may be used as pixels or sub-pixels for expressing different primary colors. In these embodiments, different colors/types of quantum dots may be hosted in different sub-pixels that are not mixed or overlapped. Color pixel values expressed by second light from the pixels or sub-pixels may be set by modulating the intensity of a first light when the first light irradiates the pixels or sub-pixels, respectively.

Figure 3A:
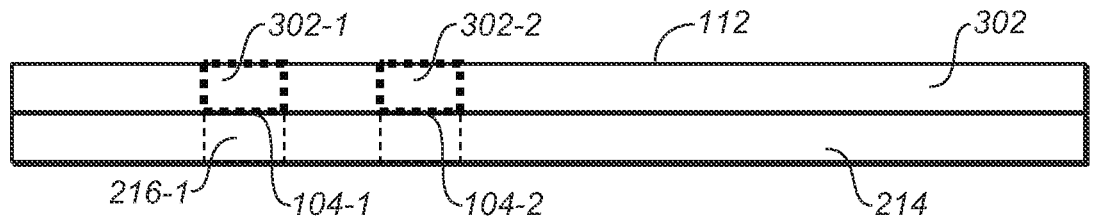
FIG. 3A and FIG. 3B illustrate example configurations in which a plurality of pixels is covered by a plurality of color filters in a side view, in accordance with some possible embodiments of the present invention.

In some embodiments, color filters may be used to impart colors. FIG. 3A illustrates an example configuration in which a plurality of pixels (which include, for example, 104-1 and 104-2) is covered by a plurality of color filters (which include, for example, 302-1 and 302-2) in a side view, in accordance with some possible embodiments of the present invention. In some embodiments, the color filters may be printed or otherwise deposited over the pixels or sub-pixels. The color filters may be aligned with the pixels or sub-pixels in a specific pattern. In some embodiments, the color filters may be part of an optical layer (e.g., 302) as shown in FIG. 3A. The optical layer (302) may be a substrate layer, a film, a sheet, etc. The color filters may comprise quantum dots only, colored dyes only, or quantum dots in part colored dyed in part. A pixel or a sub-pixel in this configuration may comprise a mixture of quantum dots that emits white light. The white light may be configured to be D65 under Rec. 709, D50 under P3, or a standard-based or non-standard-based white point.

Figure 3B:
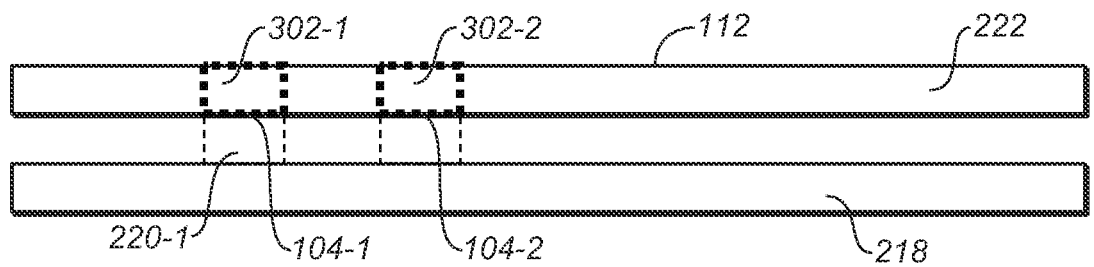

FIG. 3B illustrates another example configuration in which a plurality of pixels (which include, for example, 104-1 and 104-2) is covered by a plurality of color filters (which include, for example, 302-1 and 302-2) in a substrate (e.g., 222) in a side view, in accordance with some possible embodiments of the present invention. As shown in FIG. 3A and FIG. 3B, an image rendering surface (112) may refer to a surface formed by extending surfaces of the color filters in these example configurations.

For the purpose of illustration, pixels have been used in the example configurations depicted in FIG. 2A-FIG. 2C, FIG. 3A and FIG. 3B. It should be noted that for the purpose of the invention, sub-pixels may also be used in the example configurations in place of the pixels.

5. Separately Modulated Light Beams

Figure 1C:
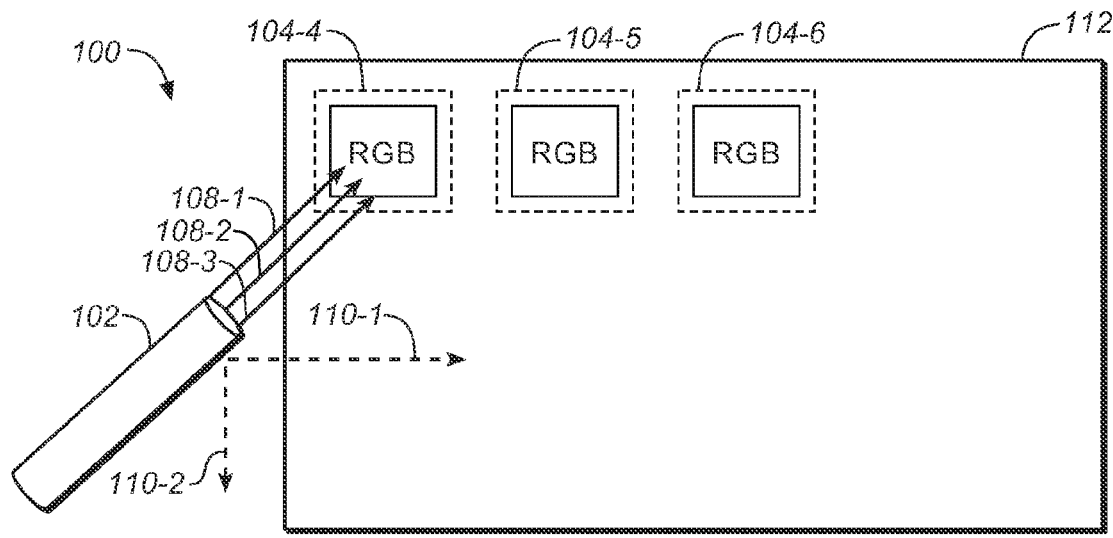
FIG. 1C illustrates an example display system in which a light source emits light in three or more different wavelength ranges each wavelength range separately excite a different one of three or more types/colors of light conversion materials, in accordance with some possible embodiments of the present invention.

FIG. 1C illustrates an example display system (e.g., 100) in which a light source (e.g., 102) emits light in three or more different wavelength ranges each wavelength range separately excites a different one of three or more types/colors of light conversion materials (e.g., quantum dots), according to an embodiment of the invention. As used herein, the term "a wavelength range" may refer to a relatively narrow distribution of wavelengths as in the case of coherent laser light. The three or more types/colors of quantum dots may be disposed in a plurality of pixels, e.g., 104-4, 104-5, 104-6, etc. The plurality of pixels may be arranged in a two-dimensional array in a geometric shape. Examples of geometric shapes the pixels may form include but are not limited only to a rectangular shape, triangular shape, elliptic shape, polygonal shape, etc.

In some embodiments, a pixel as described herein may comprise a portion in each of the three or more types/colors of quantum dots. Different types/colors of quantum dots may be arranged in an unmixed pattern, or may be arranged as a mixture as illustrated in FIG. 1C. In the illustrated embodiment in which different types of quantum dots are mixed, the spatial resolution that the display system (100) is capable of may be two, three or more times higher than otherwise.

In some embodiments, light source 102 emits light of the three or more different wavelength ranges in three or more individual light beams (e.g., 108-1, 108-2 and 108-3) that irradiates the plurality of pixels. Any of the light beams (108-1, 108-2 and 108-3) may be independently visible light (e.g., blue light) or may be invisible light (e.g., ultraviolet light). Any of the light beams (108-1, 108-2 and 108-3) may also be, but is not limited only to, coherent light which maintains a relatively small effective irradiation area on an image rendering surface (e.g., 112) at which the plurality of pixels are located.

Examples of light conversion materials as described herein may be, but are not limited to, quantum dots, quantum wells, or another material that receives energy from irradiation and converts the energy into light. For the purpose of illustration only, quantum dots are used as an example of light conversion material.

When a pixel (e.g., 104-4) with mixed quantum dots is irradiated by first light from light beam 108-1, a first color/type of quantum dots in the pixel (104-4) is excited and in turn produces a second light of a first color. The second light of the first color emitted by the pixel (104-4) may be proportional to the strength of light beam 108-1 incident on the pixel (104-4). Similarly, when the pixel (e.g., 104-4) is irradiated by a first light from light beam 108-2, a second color/type of quantum dots in the pixel (104-4) is excited and in turn produces second light of a second color. The second light of the second color emitted by the pixel (104-4) may be proportional to the strength of light beam 108-2 incident on the pixel (104-4). When the pixel (e.g., 104-4) is irradiated by first light from light beam 108-3, a third color/type of quantum dots in the pixel (104-4) is excited and in turn produces second light of a third color. The second light of the third color emitted by the pixel (104-4) may be proportional to the strength of light beam 108-3 incident on the pixel (104-4).

In some embodiments, each of the light beams (108-1, 108-2 and 108-3) sequentially scans the plurality of pixels. Scanning of the plurality of pixels may be performed in a pattern in rendering an image. The pattern may be linear, or non-linear. In a particular embodiment, the scanning may be performed first by scanning a linear pattern along one (e.g., 110-1) of two sweeping directions (e.g., 110-1 and 110-2) and by moving to scan the next linear pattern along the other (e.g., 110-2) of the two sweeping directions (110-1 and 110-2). Different light beams may perform scanning in a synchronized (same start times, same sweeping rates) manner, in a delayed synchronized (e.g., different start times but same sweeping rates) manner, or in a non-synchronized (independent uncorrelated timing with possibly different start times and different sweeping rates) manner.

The intensity of a light beam (e.g., 108-1) irradiating one pixel (e.g., 104-4) may be different from the intensity of the light beam (108-1 in this example) irradiating another pixel (e.g., 104-5).

For example, when light beam 108-1 is irradiating the pixel (104-4), the intensity of light beam 108-1 may be set to a value commensurate with a pixel value for the first color in the pixel (104-4) as determined based on image data of images to be rendered; on the other hand, when light beam 108-1 is irradiating the pixel (104-5), the intensity of light beam 108-1 may be set to a different value commensurate with a different pixel value for the first color in the pixel (104-5) as determined based on the image data.

6. 3D Displays

Figure 1D:
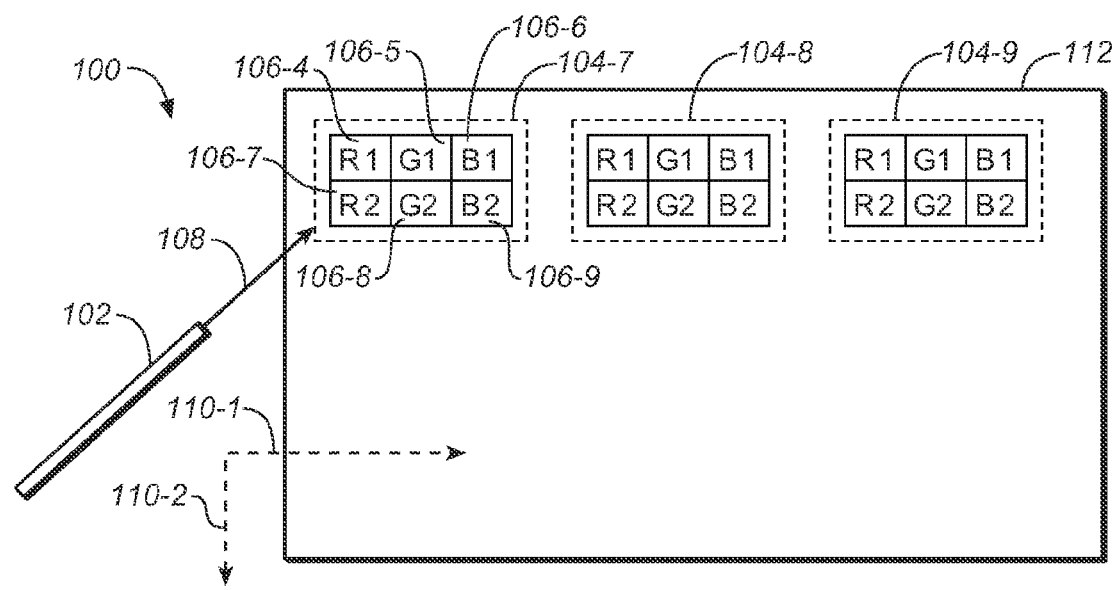

FIG. 1D illustrates an example display system (e.g., 100), according to an embodiment of the invention. In some embodiments, each pixel in a plurality of pixels (e.g., 104-7, 104-8, and 104-9) at an image rendering surface (112) comprises two sets of light conversion materials. The first set of light conversion materials comprises three or more types/colors of first light conversion materials (e.g., quantum dots) that emit second light in three or more different first colors (e.g., R1, G1, B1, etc.). The second set of light conversion materials comprises three or more types/colors of second light conversion materials (e.g., quantum dots) that emit second light in three or more different second colors (e.g., R2, G2, B2, etc.).

The plurality of pixels (e.g., 104-7, 104-8, and 104-9) may be arranged in a two-dimensional array in a geometric shape. Examples of geometric shapes the pixels may form include but are not limited only to a rectangular shape, triangular shape, elliptic shape, polygonal shape, etc.

In some embodiments, a pixel (e.g., 104-7) as described herein may comprise two sets of three or more sub-pixels. The first set of sub-pixels may comprise sub-pixels 106-4, 106-5 and 106-6. The second set of sub-pixels may comprise sub-pixels 106-7, 106-8 and 106-9. The first set of sub-pixels corresponds to the first set of light conversion materials, while the second set of sub-pixels corresponds to the second set of light conversion materials. Sub-pixels (e.g., 106-4, 106-5, 106-6, 106-7, 106-8, and 106-9) in a pixel (e.g., 104-7) may be arranged as a single point or a single blot, or in a linear or non-linear pattern.

Each of the first set of the sub-pixels (106-4, 106-5, and 106-6) may be configured to impart a specific color of three or more different first colors. For example, sub-pixel 106-4 may emit type I red light (R1) when excited by first light from light beam 108, sub-pixel 106-5 may emit type I green light (G1) when excited by first light, and sub-pixel 106-6 may emit type I blue light (B1) when excited by first light. Furthermore, sub-pixel 106-7 may emit type II red light (R2) when excited by first light from light beam 108, sub-pixel 106-8 may emit type II green light (G2) when excited by first light, and sub-pixel 106-9 may emit type II blue light (B2) when excited by first light. In some possible embodiments, more types of sub-pixels may be configured other than three primary colors. For example, a sub-pixel that is configured to emit a saturated violet color may be additionally a part of a pixel as described herein.

In embodiments in which sub-pixels are the smallest individual display units, the image data may indicate that a first sub-pixel (106-4) in a pixel (104-1) is to express a first color value (100 for R1) and that a second sub-pixel (106-5) in a pixel (which may be also 104-1) is to express a second color value (which may or may not be red, for example, 50 for G1). Accordingly, when light beam 108 is irradiating the first sub-pixel (106-4), the intensity of the first light may be set to a first value commensurate with the first color value (100 for R1); on the other hand, when light beam 108 is irradiating the second sub-pixel (106-5), the intensity of the first light may be set to a second value commensurate with the second color value (50 for G1).

In some embodiments, the first light from light source 102 sequentially scans the plurality of pixels. Scanning of the plurality of pixels may be performed in a pattern in rendering an image. The pattern may be linear, or non-linear. In a particular embodiment, the scanning may be performed first by scanning a linear pattern along one (e.g., 110-1) of two sweeping directions (e.g., 110-1 and 110-2) and by moving to scan the next linear pattern along the other (e.g., 110-2) of the two sweeping directions (110-1 and 110-2). In some embodiments, all the first sets of sub-pixels in all the pixels in the plurality of pixels may be scanned by first light before all the second sets of sub-pixels in all the pixels in the plurality of pixels, in a field sequential or frame sequential manner. In some embodiments, second light from all the first sets of sub-pixels in all the pixels in the plurality of pixels may directly render a first image, while second light from all the second sets of sub-pixels in all the pixels in the plurality of pixels may directly render a second image. In 3D display applications, one of the first or second images may be a left image, while the other may be a right image. The left and right images together form a 3D image. As used herein, "directly render" means that second light renders an image in 2D or 3D display applications directly as excited by first light with no pixel-by-pixel light modulation through a light valve layer (e.g., an LCD layer). Under techniques as described herein, light modulation that renders images is performed with first light that irradiates on light conversion materials. A display system under techniques as described herein may be free of a light valve layer.

In some embodiments, the three or more first colors (R1, G1 and B1) imparted by the first sets of sub-pixels may independently support a full complement of colors in a color space, while the three or more second colors (R2, G2 and B2) imparted by the second sets of sub-pixels may independently support the full complement of colors in the color space.

In some embodiments, light wavelengths of light of the three or more first colors (R1, G1 and B1) have no or little overlapping with light wavelengths of light of the three or more second colors (R2, G2 and B2).

In some possible embodiments, a viewer may wear a pair of glasses with a left perspective configured to be transmissive for a first set of the two sets of three or more colors but to be opaque for the other, or a second set, of the two sets of three or more colors, and with a right perspective configured to be transmissive for the second set of the two sets of three or more colors but to be opaque for the first set of the two sets of three or more colors. Under techniques as described herein, synchronization between a viewer's glasses and an image rendering system such as a display system is not needed in 3D display applications.

Figure 1E:
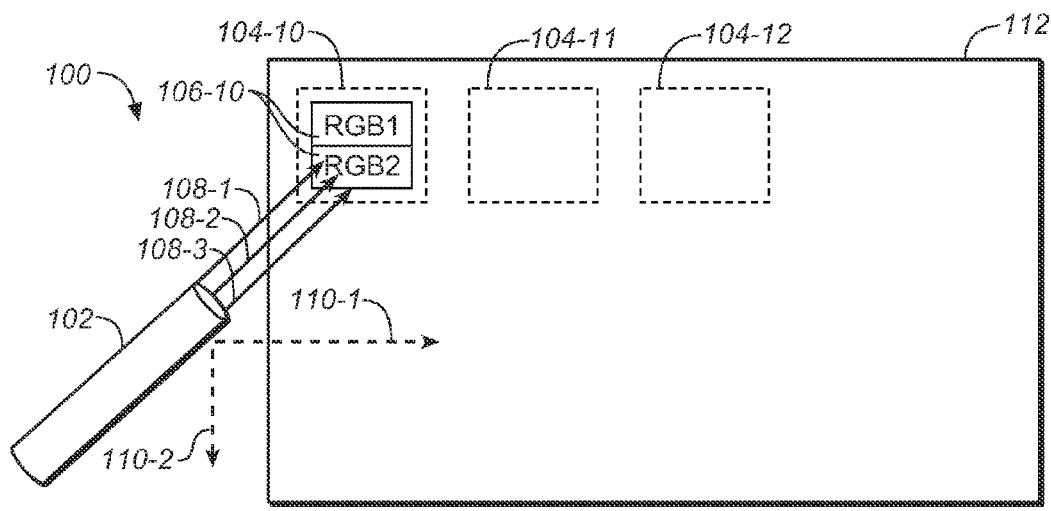

FIG. 1E illustrates another example display system (e.g., 100), according to an embodiment of the invention. In some embodiments, each pixel in a plurality of pixels (e.g., 104-10, 104-11, and 104-12) at an image rendering surface (112) comprises two sets of light conversion materials. The first set of light conversion materials comprises three or more types/colors of first light conversion materials (e.g., quantum dots) that emit second light in three or more different first colors (e.g., RGB1, etc.). The second set of light conversion materials comprises three or more types/colors of second light conversion materials (e.g., quantum dots) that emit second light in three or more different second colors (e.g., RGB2, etc.).

The plurality of pixels (e.g., 104-10, 104-11, and 104-12) may be arranged in a two-dimensional array in a geometric shape. Examples of geometric shapes the pixels may form include but are not limited only to a rectangular shape, triangular shape, elliptic shape, polygonal shape, etc.

In some embodiments, a pixel (e.g., 104-10) as described herein may comprise at least two sub-pixels. A first sub-pixel (106-10 in this example) may comprise the first set of light conversion materials, while a second sub-pixel may comprise the second set of light conversion materials. Sub-pixels (e.g., 106-10 and 106-11) in a pixel (e.g., 104-10) may be arranged as a single point or a single blot, or in a linear or non-linear pattern.

In some embodiments, light source 102 emits light of the three or more different wavelength ranges in three or more individual light beams (e.g., 108-1, 108-2 and 108-3) that irradiates the plurality of pixels. Any of the light beams (108-1, 108-2 and 108-3) may be independently visible light (e.g., blue light) or may be invisible light (e.g., ultraviolet light). Any of the light beams (108-1, 108-2 and 108-3) may also be, but is not limited only to, coherent light that maintains a relatively small effective irradiation area on an image rendering surface (e.g., 112) at which the plurality of pixels are located.

When the first sub-pixel (e.g., 106-10) with mixed quantum dots in a pixel (104-10 in this example) is irradiated by first light from light beam 108-1, a first color/type of quantum dots in the first sub-pixel (106-10) is excited and in turn produces second light of a first color in the three or more first colors (RGB1). The second light of the first color emitted by the first sub-pixel (106-10) may be proportional to the strength of light beam 108-1 incident on the first sub-pixel (106-10). Similarly, when the first sub-pixel (106-10) is irradiated by first light from light beam 108-2, a second color/type of quantum dots in the first sub-pixel (106-10) is excited and in turn produces second light of a second color in the three or more first colors (RGB1). The second light of the second color in the three or more first colors (RGB1) emitted by the first sub-pixel (106-10) may be proportional to the strength of light beam 108-2 incident on the first sub-pixel (106-10). And so on for a third color in the three or more first colors (RGB1), etc.

In a similar manner, when the second sub-pixel (e.g., 106-11) with mixed quantum dots in a pixel (104-10 in this example) is irradiated by first light from light beam 108-1, a first different color/type of quantum dots in the second sub-pixel (106-11) is excited and in turn produces second light of a first different color in the three or more second colors (RGB2). The second light of the first different color emitted by the second sub-pixel (106-11) may be proportional to the strength of light beam 108-1 incident on the second sub-pixel (106-11). Similarly, when the second sub-pixel (106-11) is irradiated by first light from light beam 108-2, a second different color/type of quantum dots in the second sub-pixel (106-11) is excited and in turn produces second light of a second different color in the three or more second colors (RGB2). The second light of the second different color in the three or more second colors (RGB2) emitted by the second sub-pixel (106-11) may be proportional to the strength of light beam 108-2 incident on the second sub-pixel (106-11). And so on for a third different color in the three or more second colors (RGB2), etc.

In some embodiments, each of the light beams (108-1, 108-2, and 108-3) sequentially scans sub-pixels in the plurality of pixels. Scanning of the plurality of pixels may be performed in a pattern in rendering an image. The pattern may be linear or non-linear. In a particular embodiment, the scanning may be performed first by scanning a linear pattern along one (e.g., 110-1) of two sweeping directions (e.g., 110-1 and 110-2) and by moving to scan the next linear pattern along the other (e.g., 110-2) of the two sweeping directions (110-1 and 110-2). Different light beams may perform scanning in a synchronized (same start times, same sweeping rates) manner, in a delayed synchronized (e.g., different start times but same sweeping rates) manner, or in a non-synchronized (independent uncorrelated timing with possibly different start times and different sweeping rates) manner.

In some embodiments, all the first sub-pixels in all the pixels in the plurality of pixels may be scanned by a first light before all the second sub-pixels in all the pixels in the plurality of pixels, in a field sequential or frame sequential manner. In some embodiments, a second light from all the first sub-pixels in all the pixels in the plurality of pixels may directly render a first image, while a second light from all the second sub-pixels in all the pixels in the plurality of pixels may directly render a second image. In 3D display applications, one of the first or second images may be a left image, while the other may be a right image. The left and right images together form a 3D image. As used herein, "directly render" means that second light renders an image in 2D or 3D display applications directly as excited by a first light with no pixel-by-pixel light modulation through a light valve layer (e.g., an LCD layer). Under techniques as described herein, light modulation that renders images is performed with a first light that irradiates on light conversion materials. A display system under techniques as described herein may be free of a light valve layer.

The intensity of a light beam (e.g., 108-1) irradiating one first sub-pixel (e.g., 106-10) in a pixel (104-10 in this example) may be different from the intensity of the light beam (108-1 in this example) irradiating another sub-pixel in another pixel.

In some embodiments, the three or more first colors (RGB1) imparted by the first sub-pixels may independently support a full complement of colors in a color space, while the three or more second colors (RGB2) imparted by the second sub-pixels may independently support the full complement of colors in the color space.

In some embodiments, light wavelengths of light of the three or more first colors (RGB1) have no or little overlapping with light wavelengths of light of the three or more second colors (RGB2).

In some possible embodiments, a viewer may wear a pair of glasses with a left perspective configured to be transmissive for a first set of the two sets of three or more colors but to be opaque for the other, or a second set, of the two sets of three or more colors, and with a right perspective configured to be transmissive for the second set of the two sets of three or more colors but to be opaque for the first set of the two sets of three or more colors. Under techniques as described herein, synchronization between a viewer's glasses and an image rendering system such as a display system is not needed in 3D display applications.

For the purpose of illustration, it has been described that a light source may comprise one or three beams of first light. Embodiments include a light source emitting different numbers of beams of first light. For example, two, four, five, six, etc., beams of first light, in the same or different wavelength ranges, may be used to excite light conversion materials to generate a second light that directly renders images specified in received or stored image data.

For the purpose of illustration, it has been described that a light source is used to sweep through an image rendering surface made of a light conversion layer. Embodiments include multiple light sources some of which may be used to sweep through a portion of an image rendering surface, while some others of which may be used to sweep through a different portion of the image rendering surface. In addition, stationary and movable optical components such as mirrors, optical masks, lenses, splitters, etc., may be used to divide or combine beams, move beams through different locations of the image rendering surface. Under techniques as described herein, while a beam of a first light moves through different pixels or sub-pixels on the image rendering surface, the intensity of the beam of first light is modulated based on received or stored image data containing images being rendered. Also, a beam of a first light as described herein may be continuous or intermittent. For example, on the way to illuminate the image rendering surface, the beam of a first light may move across an optical mask comprising perforations through which the beam of the first light may illuminate specific pixels or sub-pixels with specific intensities corresponding to the image data.

7. Light Source Control Logic

Figure 4:
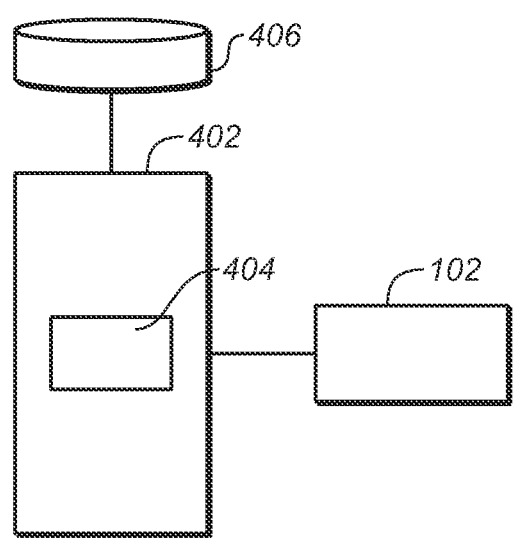
FIG. 4 illustrates an example configuration of display logic in a display system, in accordance with some possible embodiments of the present invention.

FIG. 4 illustrates an example configuration of display logic (402) in a display system (e.g., 100), in accordance with some possible embodiments of the present invention. In some possible embodiments, display logic 402 additionally and/or optionally may comprise light source control logic (404) configured to control component(s) in a light source (e.g., 102) in display system 100. The display logic 402 may be operatively coupled with an image data source 406 (e.g., a set-top box, networked server, storage media or the like) and is configured to receive image data from the image data source 406. The image data may be provided by the image data source 406 in a variety of ways including from an over-the-air broadcast, or Ethernet, High-Definition Multimedia Interface (HDMI), wireless network interface, devices (e.g., set-top box, server, storage medium, etc.), etc. Image frames received from an internal or external source may be used by the display logic 402 to drive the light source (102) in display system 100. For example, display logic 402 may be configured to control the light source (102) to move to a specific pixel or sub-pixel guide (e.g., 110 of FIG. 1B) and to illuminate the pixel or sub-pixel with a specific intensity. The image frames may be used by the display logic 402 to derive individual or aggregate pixel values in various frames in various resolutions on an image rendering surface as described herein.

8. Example Process Flow

Figure 5:
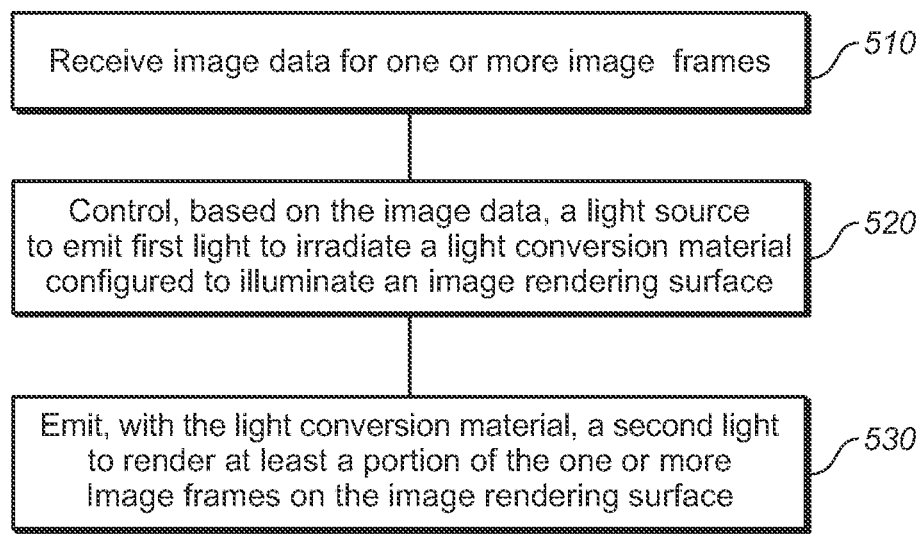
FIG. 5 illustrates an example process flow, according to a possible embodiment.

FIG. 5 illustrates an example process flow according to a possible embodiment of the present invention. In some possible embodiments, one or more computing devices or components in a display system (e.g., 100) comprising a light source control logic (e.g., 404) and a light source (e.g., 102) may perform this process flow. A display system under techniques as described herein may be free of a light valve layer on which light transmittance is modulated on a pixel-by-pixel basis. In block 510, the display system (100) receives image data for one or more image frames.

In block 520, the display system (100) controls, based on the image data, a light source to emit first light to irradiate a light conversion material configured to illuminate an image rendering surface.

In block 510, the display system (100) emits, with the light conversion material, second light to render at least a portion of the one or more image frames on the image rendering surface. Here, the second light emitted by the light conversion material is excited by the first light.

In some embodiments, the light conversion material is one of one or more light conversion materials disposed in a two dimensional array to form a plurality of pixels.

In some embodiments, a pixel may be the most basic display unit structure in the display system (which may be, but is not limited only to, a monochromatic display system or a color display system with color filters). In some other embodiments, a pixel may further comprise three or more sub-pixels (as basic display unit structures) each configured to impart one of three or more different colors.

In some embodiments, the light source is a laser that emits a coherent laser beam as the first light. In some embodiments, the first light sweeps though a portion of the image rendering area in at least one sweeping direction. In some embodiments, strength of the first light is modulated based on at least a portion of the image data, as the first light is sweeping through the portion of the image rendering area. In some embodiments, the light source is located in front of, behind, and/or at a top position, a bottom position or another position relative to, the image rendering surface.

In some embodiments, a light conversion material as described herein comprises quantum dots. The quantum dots may comprise three or more different types of quantum dots, each type configured to emit a different one of three or more different colors. In some embodiments, different types of quantum dots are not mixed. For example, each type of quantum dots, in the three or more different types of quantum dots, is located in a separate area separate from other areas in which other types of quantum dots, in the three or more different types of quantum dots, are located. In some other embodiments, some or all of different types of quantum dots may be mixed. For example, two or more types of quantum dots, in the three or more different types of quantum dots, are located in a common area in a mixed state.

In some embodiments, the first light comprises two or more mutually non-overlapping wavelength ranges. Each of the mutually non-overlapping wavelength ranges may correspond to one of two or more different colors. In some embodiments, the first light in a first mutually non-overlapping wavelength range, in the mutually non-overlapping wavelength ranges, irradiates a first type of quantum dots at the same time as the first light in a second different mutually non-overlapping wavelength range, in the mutually non-overlapping wavelength ranges, irradiates a second different type of quantum dots. In some embodiments, "mutually non-overlapping" may also refer to only minimal or imperceptible overlapping wavelengths between two mutually non-overlapping wavelength ranges. In some embodiments, a wavelength range is contiguous, while in some other embodiments, a wavelength range may be discrete or otherwise may comprise discontinuity.

In some embodiments, the light conversion material comprises three or more different types of quantum dots. The three or more different types of quantum dots may be irradiated at three or more mutually non-overlapping time durations. For example, a light beam emitting the first light may sweep three different sub-pixels in a pixel at three different non-overlapping time durations one by one.

In some embodiments, the light conversion material comprises two or more distinct sets of quantum dots. Correspondingly, the first light may comprise light in two or more distinct sets of wavelengths. A first distinct set of quantum dots, in the two or more distinct sets of quantum dots, may be only responsive to light in a first distinct set of wavelengths, in the two or more distinct sets of wavelengths. A second different distinct set of quantum dots, in the two or more distinct sets of quantum dots, may be only responsive to light in a second different distinct set of wavelengths, in the two or more distinct sets of wavelengths. In some embodiments, the first distinct set of quantum dots may be configured to render a left image frame, while the second different distinct set of quantum dots may be configured to render a right image frame. In some embodiments, the left image frame and the right image frame form a 3 dimensional (3D) image. In some embodiments, the left image frame and the right image frame may be rendered one after the other in a time-wise frame sequence.

In some embodiments, the second light emitted with a first set of quantum dots renders a left image block of a stereoscopic image, while the second light emitted with a second different set of quantum dots renders a right image block of the stereoscopic image. In some embodiments, at least one of the left image block or the right image block is one of a H.264 macroblock or a H.264 sub-macroblock.

9. Implementation Mechanisms

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
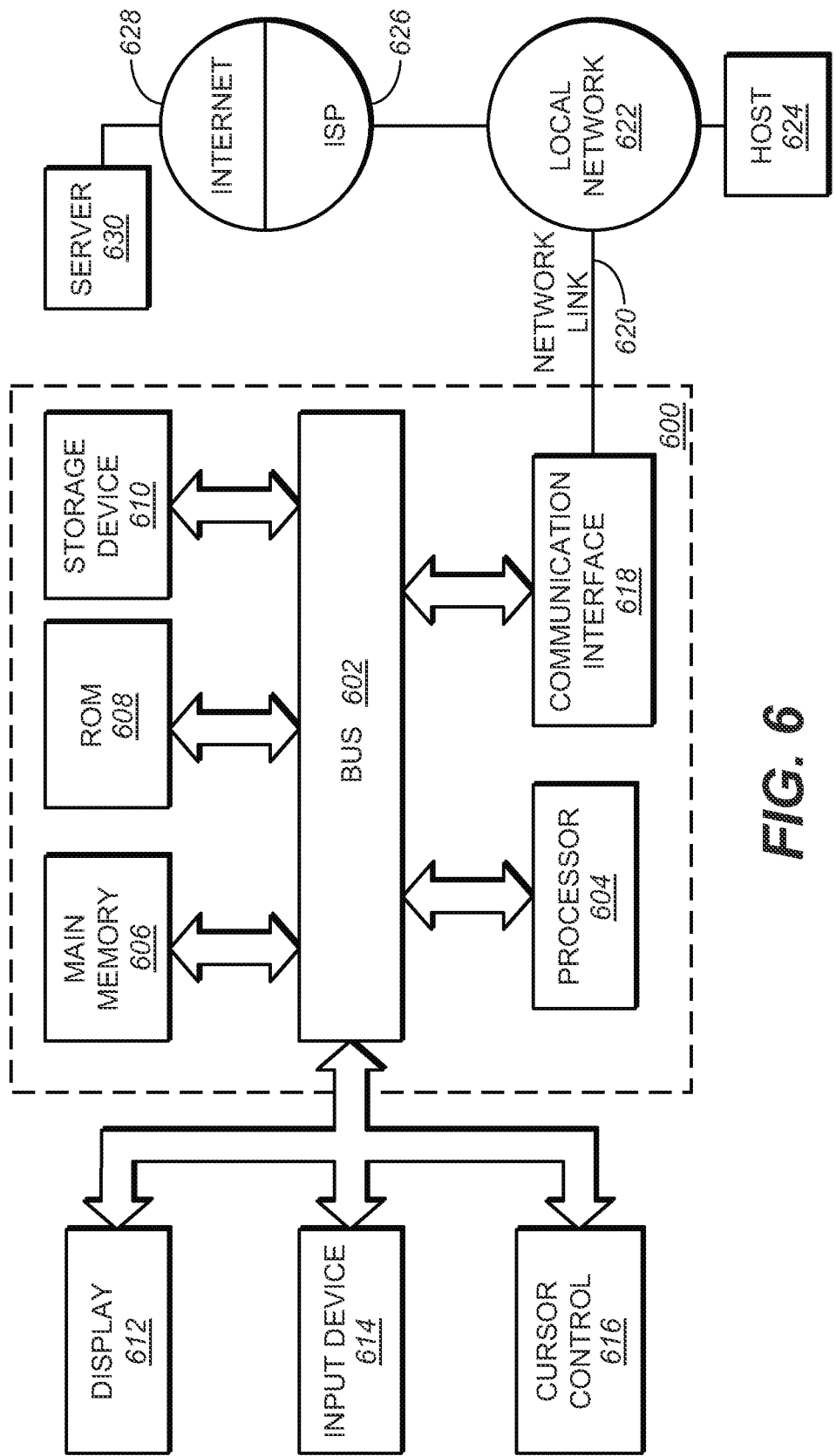
FIG. 6 illustrates an example hardware platform on which a computer or a computing device as described herein may be implemented, according a possible embodiment of the present invention.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques as described herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

10. Equivalents, Extensions, Alternatives and Miscellaneous

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving image data for stereoscopic image frames;
   controlling, based on the image data, a light source to emit a first light to irradiate a light conversion material disposed with an image rendering surface;
   emitting, with the light conversion material, a second light to render at least a portion of the stereoscopic image frames on the image rendering surface;
   wherein
   the second light is excited by the first light,
   the light conversion material includes quantum dots, the second light is non-coherent light,
   the quantum dots are disposed in a two dimensional array on the image rendering surface to form a plurality of pixels, each pixel in the plurality of pixels comprises a first red sub-pixel configured to impart a first red color light in the second light and a second red sub-pixel configured to impart a second red color light in the second light, the first red color light and the second red color light are of mutually non-overlapping wavelengths,
   the first light represents one or more light beams sequentially scanning the plurality of pixels,
   the first red sub-pixel is associated with a left image block of the stereoscopic image frames; and
   the second red sub-pixel is associated with a right image block of the stereoscopic image frames.

2. The method of claim 1, wherein each pixel in the plurality of pixels comprises six sub-pixels each configured to impart different colors.

3. The method of claim 1, wherein the light source is a laser that emits a coherent laser beam as the first light.

4. The method of claim 1, wherein the first light sweeps though a portion of the image rendering area in at least one sweeping direction.

5. The method of claim 1, wherein strength of the first light is modulated based on at least a portion of the image data, as the first light is sweeping through the portion of the image rendering area.

6. The method of claim 1, wherein the light source is located at least one of: in front, behind, above, and below relative to the image rendering surface.

7. The method of claim 1, wherein the quantum dots comprise six different types of quantum dots, each type configured to emit a different color.

8. The method of claim 1, wherein the first light comprises two mutually non-overlapping wavelength ranges, wherein each of the mutually non-overlapping wavelength ranges corresponds different colors, and wherein the first light in a first mutually non-overlapping wavelength range, in the mutually non-overlapping wavelength ranges, irradiates a first type of quantum dots at a same time as the first light in a second different mutually non-overlapping wavelength range, in the mutually non-overlapping wavelength ranges, irradiates a second different type of quantum dots.

9. The method of claim 1, wherein the light conversion material comprises six different types of quantum dots, and wherein the six different types of quantum dots are irradiated at three mutually non-overlapping time durations.

10. The method of claim 1, wherein the second light emitted with a first set of quantum dots renders the left image block of a stereoscopic image, while the second light emitted with a second different set of quantum dots renders the right image block of the stereoscopic image.

11. A display system comprising:
    a light conversion material disposed with an image rendering surface and configured to emit a second light to render at least a portion of one or image frames on the image rendering surface;
    a light source to emit a first light to irradiate the light conversion material and to excite the light conversion material to emit the second light;
    wherein the display system is configured to receive image data for the one or more image frames, and to control, based on the image data, the light source to emit the first light to irradiate the light conversion material disposed with the image rendering surface,
    wherein
    the light conversion material includes at least one of quantum dots and quantum wells, the second light is non-coherent light,
    the quantum dots and/or quantum wells are disposed in a two dimensional array on the image rendering surface to form a plurality of pixels, each pixel in the plurality of pixels comprises a first red sub-pixel configured to impart a first red color light in the second light and a second red sub-pixel configured to impart a second red color light in the second light, the first red color light and the second red color light are of mutually non-overlapping wavelengths,
    the first light represents one or more light beams sequentially scanning the plurality of pixels,
    the first red sub-pixel is associated with a left image block of a stereoscopic image, and
    the second red sub-pixel is associated with a right image block of the stereoscopic image.

12. The display system of claim 11, wherein each pixel in the plurality of pixels comprises six sub-pixels each configured to impart different colors.

13. The display system of claim 11, wherein the light source is a laser that emits a coherent laser beam as the first light.

14. The display system of claim 11, wherein the light source is configure to cause the first light to sweep through a portion of the image rendering area in at least one sweeping direction.

15. The display system of claim 11, wherein strength of the first light is modulated based on at least a portion of the image data, as the first light is sweeping through the portion of the image rendering area.

16. The display system of claim 11, wherein the light source is located in front of, behind, or at a top position, a bottom position, or another position relative to, the image rendering surface.

17. A non-transitory computer readable storage medium, comprising software instructions, which when executed by one or more processors cause performance of the methods recited in claim 1.

* * * * *